(No Model.) 2 Sheets—Sheet 1.
H. W. AVERY.
SHEET METAL HANDLE.

No. 413,640. Patented Oct. 29, 1889.

WITNESSES.
Frank Meiller
W. J. Bainbridge

INVENTOR.
Henry W. Avery
By his attorneys
Watson + Thurston (No Model.) 2 Sheets—Sheet 2.
H. W. AVERY.
SHEET METAL HANDLE.
No. 413,640. Patented Oct. 29, 1889.

WITNESSES.
Frank Miller.
W. J. Bainbridge

INVENTOR.
Henry W. Avery
By his attorneys
Watson & Thurston

UNITED STATES PATENT OFFICE.

HENRY W. AVERY, OF CLEVELAND, OHIO, ASSIGNOR TO THE AVERY STAMPING COMPANY, OF SAME PLACE.

SHEET-METAL HANDLE.

SPECIFICATION forming part of Letters Patent No. 413,640, dated October 29, 1889.

Application filed February 20, 1889. Serial No. 300,572. (No model.)

*To all whom it may concern:*

Be it known that I, HENRY W. AVERY, a citizen of the United States, residing at Cleveland, in the county of Cuyahoga and State of Ohio, have invented certain new and useful Improvements in Sheet-Metal Handles, of which the following is a full, clear, and exact description, reference being had to the accompanying drawings, in which—

Figure 1:
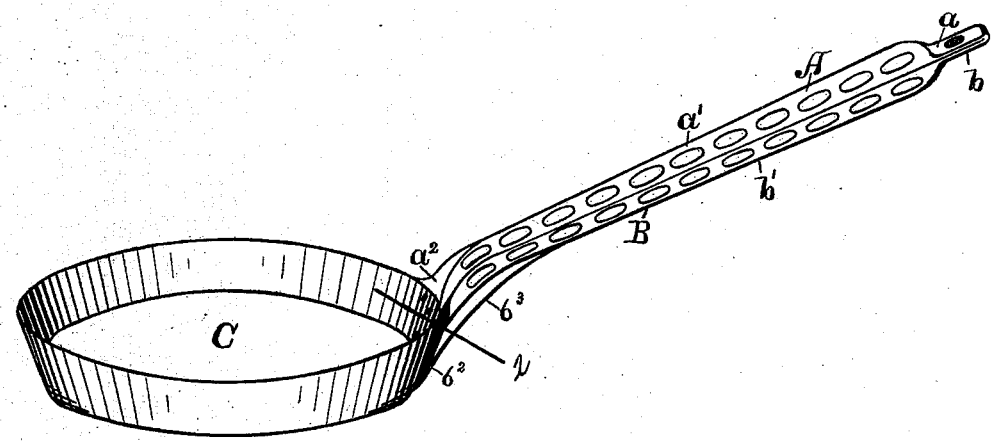
Figure 2:
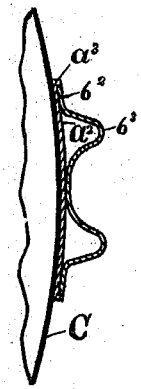
Figure 3:
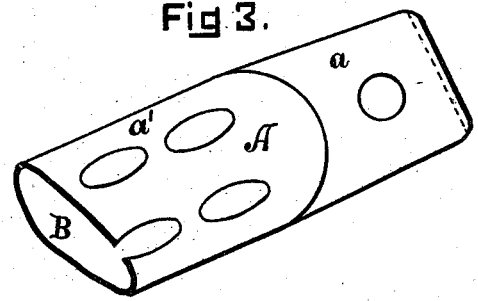
Figure 4:
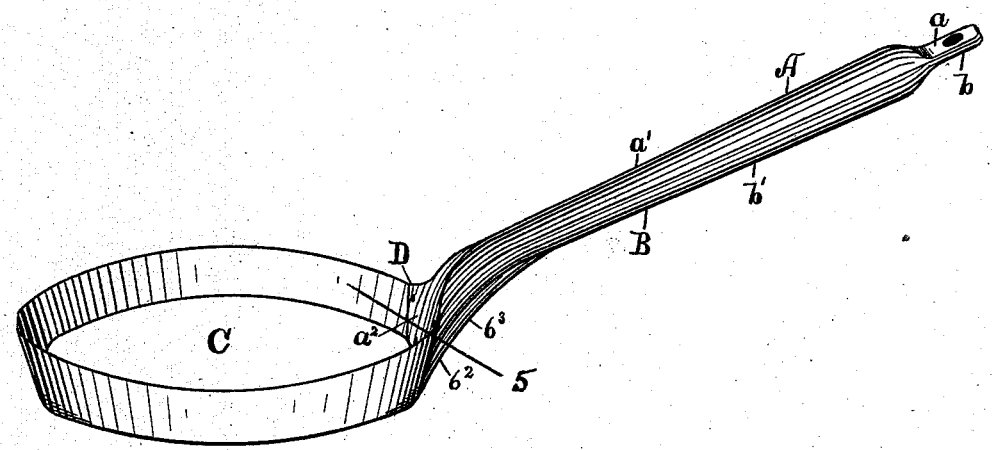
Figure 5:
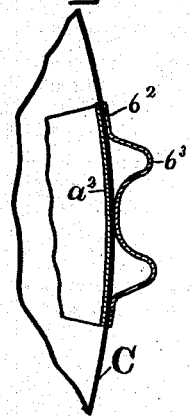
Figure 6:
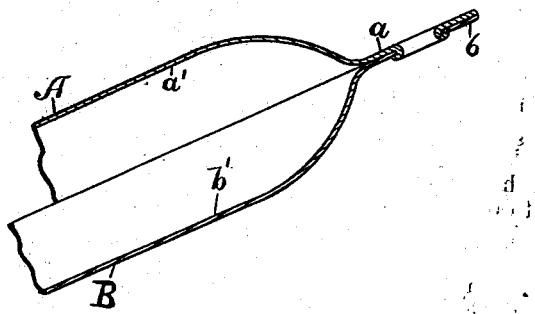

Figure 1 is a perspective view of my improved handle attached to a skillet. Fig. 2 is a sectional view on the line 2, Fig. 1. Fig. 3 is a top plan view of the outer end of said handle. Fig. 4 is a perspective view of a handle of a modified form, also attached to a skillet. Fig. 5 is a sectional view on the line 5, Fig. 4. Fig. 6 is a central vertical section through the outer end of the handle shown in Fig. 4.

My invention relates to sheet-metal handles, especially adapted for use with culinary utensils; and the object is to provide a handle having the following desirable characteristics, viz: strength, lightness, and cheapness.

To this end it consists in the novel construction and combination of parts herein described, and pointed out definitely in the claims.

Referring to the drawings, it will be seen that the handle consists of two parts—the upper part A and the lower part B—which may or may not be parts of the same piece of metal. These two parts are drawn into the form shown between suitable dies, the outer ends of both parts being flat, as shown in the drawings. The bodies of both parts are bent longitudinally, so that when the two parts are secured together, in the manner hereinafter described, the body of the handle will be tubular and preferably about circular in transverse section. At its inner end the part A is bent transversely downward at the proper angle with the body, and the part so bent down is shaped to fit the side of the pan C or the other vessel to which it is to be secured.

In the best embodiment of my invention a flange $a^3$ is turned up around the inner end of part A, as shown in Fig. 2, for the purpose hereinafter pointed out. The inner end of the part B is also bent down, as shown, and the part so bent down is shaped to fit within the space bounded by the flange $a^3$. The ribs or corrugations $b^3 b^3$ are pressed outward from the part B, in what may be termed the neck thereof. The number of these ribs is not material, two being shown in the drawings, because two ribs are easily formed and satisfactorily accomplish the desired result. This result is to prevent the handle, especially the lower part B thereof, from bending at the neck, where it would be most likely to bend without such ribs.

The two parts of the handle are laid together, as shown in Fig. 1, and their inner ends are secured together and to the pan by the rivets D. When a pan is lifted by the handle, its weight tends to spread the ribs $b^3 b^3$ sidewise and flatten them out, which would weaken the handle. This tendency of the ribs to flatten out is resisted in every case by the rivets D, which lie at the sides of the ribs, and in the construction illustrated in Fig. 2 it is still further resisted by the flange $a^3$, thereby relieving the rivets of considerable strain. The outer ends of the two parts A B of the handle are also fastened firmly together, whereby the two parts re-enforce and strengthen each other. In my opinion the cheapest and best way of accomplishing this result is to stamp the two parts from opposite ends of the same piece of metal and then to bend the metal transversely at the middle to bring the two parts together, as shown in Fig. 1. Another way of securing this result, when the two parts are made from separate pieces, is to punch a hole in the flat end of one piece and then to upset the metal through the larger hole after the fashion of an eyelet, as shown in Fig. 6; or the two parts may be secured together in any other suitable manner.

Instead of fastening both parts of the handle to the pan on the outside thereof, as heretofore described, the flange $a^3$ may be omitted and the two parts fastened together and to the pan, with the pan between them, as shown in Fig. 5.

By the construction heretofore described a handle of pleasing appearance, of such shape as can be most conveniently grasped by the hand and of sufficient strength, may be made from very thin sheet metal, and this handle will be lighter than one of equal strength made of a single thickness of metal. The handle may be perforated, as shown in Fig. 1, without seriously affecting its strength, which will render it still lighter and also permit the air to circulate on the inside thereof, thereby tending to keep the handle cool enough to be handled without danger.

Having thus described my invention, what I claim as new, and desire to secure by Letters Patent, is—

1. A sheet-metal handle consisting of the upper part A, having a flat outer end, a longitudinally-bent body, and an inner end bent transversely at an angle to said body, said inner end having the flange $a^3$, combined with the lower part B, having a flat outer end, a longitudinally-bent body, and an inner end bent transversely at an angle to said body, said two parts being fastened together at their outer and inner ends, respectively, substantially as and for the purpose specified.

2. A sheet-metal handle formed from a single piece of sheet metal, consisting of a straight central portion having at one side thereof a part A, having a longitudinally-bent body and an end bent transversely at an angle to said body and having at the other side a part B, having a longitudinally-bent body and an end bent transversely at an angle thereto, said piece of metal being bent transversely in its flat middle portion to bring the two parts A and B together, substantially as and for the purpose specified.

HENRY W. AVERY.

Witnesses:
E. L. THURSTON,
WILL J. BAINBRIDGE.